(12) United States Patent
Ziegler (10) Patent No.: US 11,905,126 B2
(45) Date of Patent: Feb. 20, 2024

(54) METHOD AND SYSTEM FOR CONVEYING ARTICLES (71) Applicant: Graphic Packaging International, LLC, Atlanta, GA (US)

(72) Inventor: Kelly W. Ziegler, Crosby, MN (US)

(73) Assignee: Graphic Packaging International, LLC, Atlanta, GA (US)

( * ) Notice: Subject to any disclaimer, the term of this patent is extended or adjusted under 35 U.S.C. 154(b) by 0 days.

(21) Appl. No.: 17/337,760

(22) Filed: Jun. 3, 2021

(65) Prior Publication Data

US 2021/0284467 A1 Sep. 16, 2021

Related U.S. Application Data

(62) Division of application No. 16/600,788, filed on Oct. 14, 2019, now Pat. No. 11,053,086.

(60) Provisional application No. 62/786,798, filed on Dec. 31, 2018, provisional application No. 62/746,212, filed on Oct. 16, 2018.

(51) Int. Cl.
*B65G 47/68* (2006.01)
(52) U.S. Cl.
CPC ................................. *B65G 47/681* (2013.01)
(58) Field of Classification Search
CPC .................................................... B65G 47/681
See application file for complete search history.

(56) References Cited

U.S. PATENT DOCUMENTS

| 770,523 A | 9/1904 | Haley |
| 2,007,981 A | 7/1935 | Nordquist |
| 2,108,522 A | 2/1938 | Bergmann |
| 2,801,650 A | 8/1957 | Breeback |
| 2,801,651 A | 8/1957 | Street |

(Continued)

FOREIGN PATENT DOCUMENTS

| CN | 1895972 | 1/2007 |
| CN | 101489872 | 7/2009 |

(Continued)

OTHER PUBLICATIONS

International Search Report and Written Opinion for PCT/US2019/056051 dated Feb. 4, 2020.

(Continued)

*Primary Examiner* — William R Harp
(74) *Attorney, Agent, or Firm* — Womble Bond Dickinson (US) LLP (57) ABSTRACT

A method of conveying articles includes moving a first plurality of articles in a first input lane and a moving second plurality of articles in a second input lane in a downstream direction to a lane combiner, and operating the lane combiner to combine the first plurality of articles and the second plurality of articles into a combined plurality of articles in an output lane. The operating the lane combiner includes engaging a first article from the first plurality of articles with a first combiner wheel, engaging a second article from the second plurality of articles with a second combiner wheel that is out of phase with the first combiner wheel, rotating the first combiner wheel and the second combiner wheel to move the first article and then the second article into the output lane, the combined plurality of articles includes the first article and the second article in sequence.

21 Claims, 8 Drawing Sheets

(56) References Cited

U.S. PATENT DOCUMENTS

| | | |
|---|---|---|
| 2,829,757 A | 4/1958 | Breeback |
| 2,868,243 A | 1/1959 | Henschen et al. |
| 2,936,557 A | 5/1960 | Fay |
| 3,178,006 A | 4/1965 | Nigrelli |
| 3,193,078 A | 7/1965 | Amenta et al. |
| 3,197,014 A | 7/1965 | Meyer |
| 3,311,217 A | 3/1967 | Muhlenbruch |
| 3,323,275 A | 6/1967 | Kingsbury |
| 3,388,815 A | 6/1968 | Lingl |
| 3,469,673 A | 9/1969 | Gentry |
| 3,528,566 A | 9/1970 | Weir |
| 3,556,279 A | 1/1971 | Cotter |
| 3,618,743 A | 11/1971 | Benatar et al. |
| 3,655,031 A | 4/1972 | Cahn |
| 3,821,874 A | 7/1974 | Jones |
| 3,881,298 A | 5/1975 | Griner et al. |
| 4,018,324 A | 4/1977 | Kamphues |
| 4,067,433 A | 1/1978 | Phipps |
| 4,274,533 A | 6/1981 | Abe |
| 4,577,745 A | 3/1986 | Calvert et al. |
| 4,768,329 A | 9/1988 | Borrow |
| 4,771,589 A | 9/1988 | Mueller |
| 4,875,323 A | 10/1989 | Craighead |
| 4,934,129 A | 6/1990 | Hoffman et al. |
| 4,936,077 A | 6/1990 | Langen |
| 4,982,556 A | 1/1991 | Tisma |
| 5,020,655 A | 6/1991 | Cruver |
| 5,165,517 A | 11/1992 | Auld et al. |
| 5,174,430 A | 12/1992 | Ebira |
| 5,237,795 A | 8/1993 | Cheney et al. |
| 5,271,709 A | 12/1993 | VanderMeer et al. |
| 5,347,796 A | 9/1994 | Ziegler et al. |
| 5,388,389 A | 2/1995 | Tisma |
| 5,437,143 A | 8/1995 | Culpepper et al. |
| 5,450,708 A | 9/1995 | Lashyro |
| 5,456,058 A | 10/1995 | Ziegler |
| 5,501,552 A | 3/1996 | Simkowski |
| 5,546,734 A | 8/1996 | Moncrief |
| 5,547,004 A | 8/1996 | Fransen |
| 5,579,895 A | 12/1996 | Davis, Jr. |
| 5,727,365 A | 3/1998 | Lashyro et al. |
| 5,758,474 A | 6/1998 | Ziegler |
| 5,896,728 A | 4/1999 | Domino et al. |
| 5,944,165 A | 8/1999 | Mannlein et al. |
| 6,058,679 A | 5/2000 | Ziegler et al. |
| 6,105,338 A | 8/2000 | Kalany et al. |
| 6,308,502 B1 | 10/2001 | Olson |
| 6,889,485 B2 | 5/2005 | Davaillon |
| 6,907,979 B2 | 6/2005 | Ford et al. |
| 7,000,755 B2 | 2/2006 | van Pinxteren et al. |
| 7,055,671 B2 | 6/2006 | De Guglielmo et al. |
| 7,104,027 B2 | 9/2006 | Ford et al. |
| 7,128,217 B2 | 10/2006 | Henry |
| 7,134,258 B2 | 11/2006 | Kalany et al. |
| 7,240,784 B2 | 7/2007 | Bonnain et al. |
| 7,273,343 B2 | 9/2007 | Ziegler |
| 7,316,103 B2 | 1/2008 | Ford |
| 7,341,141 B2 | 3/2008 | Spatafora |
| 7,481,309 B2 | 1/2009 | Wagner et al. |
| 7,503,157 B2 | 3/2009 | Ford |
| 7,726,464 B2 | 6/2010 | Cerf |
| 7,779,606 B2 | 8/2010 | Ford |
| 7,784,599 B2 | 8/2010 | Balleza et al. |
| 7,815,034 B2 | 10/2010 | Fleck et al. |
| 7,866,458 B2 | 1/2011 | Charpentier |
| 7,921,983 B2 | 4/2011 | Gimmerstam et al. |
| 8,002,105 B2 | 8/2011 | Duchemin et al. |
| 8,015,776 B2 | 9/2011 | Alfonso et al. |
| 8,074,430 B2 | 12/2011 | Disrud |
| 8,079,458 B2 | 12/2011 | Fleischmann et al. |
| 8,113,335 B2 | 2/2012 | Aronsson et al. |
| 8,286,781 B2 | 10/2012 | Kamps et al. |
| 8,458,874 B2 | 6/2013 | Ziegler |
| 8,596,446 B2 | 12/2013 | Biggel et al. |
| 8,695,781 B2 | 4/2014 | Mougin et al. |
| 8,893,454 B2 | 11/2014 | Disrud |
| 9,085,421 B2 | 7/2015 | Ford |
| 9,174,753 B2 | 11/2015 | Cain |
| 9,205,939 B2 | 12/2015 | Disrud et al. |
| 9,233,769 B2 | 1/2016 | Disrud et al. |
| 9,238,558 B2 | 1/2016 | Houck et al. |
| 9,346,573 B2 | 5/2016 | Disrud et al. |
| 9,346,574 B2 | 5/2016 | Disrud et al. |
| 9,365,358 B2 | 6/2016 | Barber et al. |
| 9,623,522 B2 | 4/2017 | Ziegler |
| 9,650,212 B2 | 5/2017 | Sassi et al. |
| 9,764,904 B2 | 9/2017 | Barber et al. |
| 9,776,750 B2 | 10/2017 | May et al. |
| 9,919,823 B2 | 3/2018 | Disrud |
| 10,040,587 B2 * | 8/2018 | Rapparini ............ B65B 29/022 |
| 10,071,828 B2 | 9/2018 | Moncrief et al. |
| 10,245,687 B2 | 4/2019 | Ziegler |
| 10,399,719 B2 | 9/2019 | Disrud et al. |
| 10,414,528 B2 | 9/2019 | Ford |
| 10,421,572 B2 | 9/2019 | Moncrief et al. |
| 11,053,086 B2 * | 7/2021 | Ziegler ................ B65G 47/681 |
| 2004/0050663 A1 | 3/2004 | Ford et al. |
| 2005/0230221 A1 | 10/2005 | Guglielmo et al. |
| 2008/0257684 A1 | 10/2008 | Weller |
| 2010/0043355 A1 | 2/2010 | Duperray et al. |
| 2010/0162668 A1 | 7/2010 | Cain |
| 2011/0030311 A1 | 2/2011 | Martini |
| 2014/0061000 A1 | 3/2014 | Ford |

FOREIGN PATENT DOCUMENTS

| | | |
|---|---|---|
| CN | 102083694 | 6/2011 |
| CN | 102272005 | 12/2011 |
| EP | 0 717 702 A1 | 6/1996 |
| JP | S54-183087 | 12/1979 |
| JP | 11-157508 | 6/1999 |
| JP | 2008-531440 A | 8/2008 |
| KR | 10-2008-0044613 A | 5/2008 |
| WO | WO 96/08434 | 3/1996 |

OTHER PUBLICATIONS

Issue Fee Transmittal Form for U.S. Appl. No. 16/600,788 dated Jun. 3, 2021.

Notice of Allowance and Fee(s) Due for U.S. Appl. No. 16/600,788 dated Mar. 31, 2021.

Amendment B and Response to Final Office Action for U.S. Appl. No. 16/600,788 dated Mar. 23, 2021.

Office Action for U.S. Appl. No. 16/600,788 dated Dec. 24, 2020.

Amendment A and Response to Office Action for U.S. Appl. No. 16/600,788 dated Sep. 17, 2020.

Office Action for U.S. Appl. No. 16/600,788 dated Jun. 25, 2020.

Supplementary European Search Report for EP 19 87 2685 dated Jun. 20, 2022.

Notice of Reasons for Refusal for Japanese Patent Application No. 2021-521147 dated Oct. 26, 2023, with English translation.

* cited by examiner

METHOD AND SYSTEM FOR CONVEYING ARTICLES

CROSS-REFERENCE TO RELATED APPLICATIONS

This application is a divisional of U.S. patent application Ser. No. 16/600,788, filed on Oct. 14, 2019, which claims the benefit of each of U.S. Provisional Patent Application No. 62/746,212, filed on Oct. 16, 2018, and U.S. Provisional Patent Application No. 62/786,798, filed on Dec. 31, 2018.

INCORPORATION BY REFERENCE

The disclosures of each of U.S. patent application Ser. No. 16/600,788, filed on Oct. 14, 2019, U.S. Provisional Patent Application No. 62/746,212, filed on Oct. 16, 2018, and U.S. Provisional Patent Application No. 62/786,798, filed on Dec. 31, 2018, are hereby incorporated by reference as if presented herein in their entirety and are incorporated by reference for all purposes.

BACKGROUND OF THE DISCLOSURE

The present disclosure generally relates to systems and methods for conveying articles in a packaging machine. More specifically, the present disclosure is directed to methods and systems for combining multiple feeds of the articles prior to loading the articles into cartons.

SUMMARY OF THE DISCLOSURE

According to one aspect of the disclosure, a method of conveying articles comprises moving a first plurality of articles in a first input lane in a downstream direction to a lane combiner, moving a second plurality of articles in a second input lane in the downstream direction to the lane combiner, and operating the lane combiner to combine the first plurality of articles and the second plurality of articles into a combined plurality of articles in an output lane. The operating the lane combiner comprises engaging a first article from the first plurality of articles with a first combiner wheel, engaging a second article from the second plurality of articles with a second combiner wheel that is out of phase with the first combiner wheel, rotating the first combiner wheel to move the first article into the output lane, rotating the second combiner wheel to move the second article into the output lane after the first article, and the combined plurality of articles comprises the first article and the second article in sequence.

According to another aspect of the disclosure, a system for conveying articles comprises a first input lane, a second input lane, and a lane combiner positioned downstream from the first input lane and the second input lane and comprising a first combiner wheel that is out of phase with a second combiner wheel. The first combiner wheel is positioned to engage a first article from a first plurality of articles in the first output lane and the second combiner wheel is positioned to engage a second article from a second plurality of articles in the second input lane. Upon out of phase rotation of the first combiner wheel and the second combiner wheel, the first article is moved into the output lane and the second article is moved into the output lane after the first article to form a combined plurality of articles that comprises the first article and second article in sequence.

According to another aspect of the disclosure, a lane combiner comprises a first combiner wheel and a second combiner wheel that is out of phase with a second combiner wheel. The lane combiner is positioned downstream from a first input lane and a second input lane such that the first combiner wheel is positioned to engage a first article from a first plurality of articles in the first output lane and the second combiner wheel is positioned to engage a second article from a second plurality of articles in the second input lane. Upon out of phase rotation of the first combiner wheel and the second combiner wheel, the first article is moved into the output lane and the second article is moved into the output lane after the first article to form a combined plurality of articles that comprises the first article and second article in sequence.

Additional aspects, features, and advantages of the present invention will become apparent from the following description and accompanying figures.

BRIEF DESCRIPTION OF THE DRAWINGS

Those skilled in the art will appreciate the above stated advantages and other advantages and benefits of various additional embodiments reading the following detailed description of the embodiments with reference to the below-listed drawing figures. It is within the scope of the present disclosure that the above-discussed aspects be provided both individually and in various combinations.

According to common practice, the various features of the drawings discussed below are not necessarily drawn to scale. Dimensions of various features and elements in the drawings may be expanded or reduced to more clearly illustrate the embodiments of the disclosure.

Corresponding parts are designated by corresponding reference numbers throughout the drawings.

DETAILED DESCRIPTION OF THE EXEMPLARY EMBODIMENTS

The present disclosure generally relates to a system and method of conveying or feeding articles prior to loading the articles into cartons in a packaging machine. The system according to the present disclosure can accommodate articles of any shape. The articles can be containers, bottles, cans, etc. The articles can be used for packaging food and beverage products, for example. The articles can be made from materials suitable in composition for packaging the particular food or beverage item, and the materials include, but are not limited to, aluminum and/or other metals; glass; plastics such as PET, LDPE, LLDPE, HDPE, PP, PS, PVC, EVOH, and Nylon; and the like, or any combination thereof.

Figure 1:
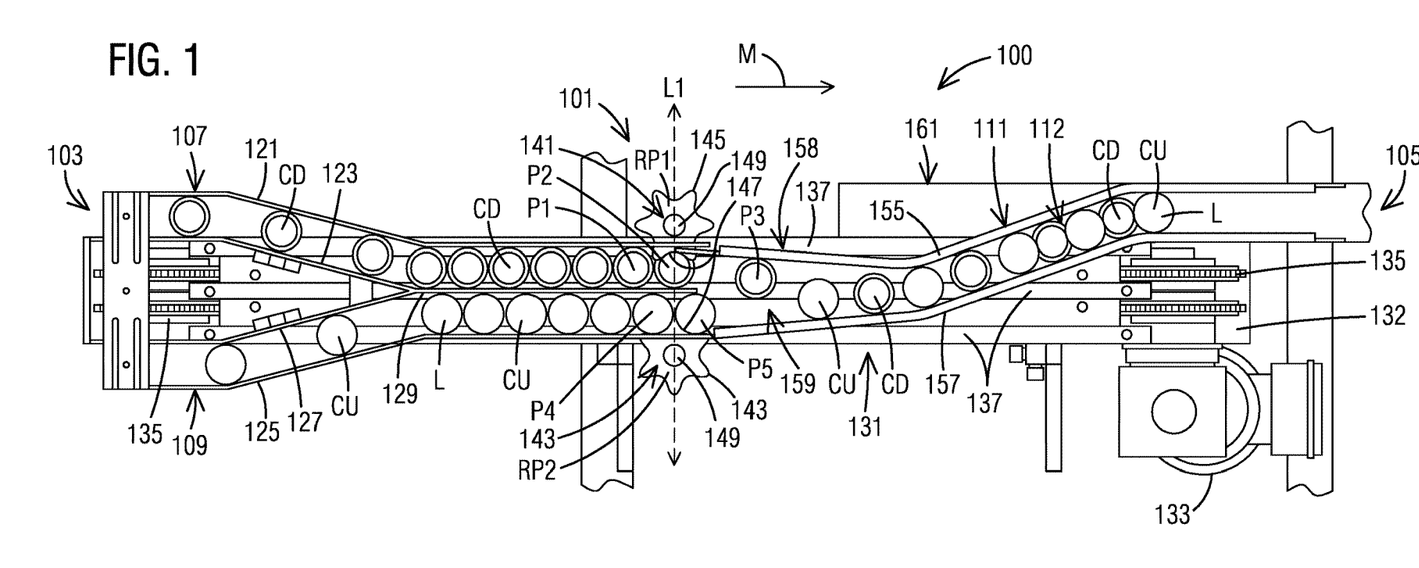
FIG. 1 is a schematic plan view of a system for conveying articles according to a first exemplary embodiment of the disclosure.

FIG. 1 generally illustrates an example embodiment of a system and method 100 for conveying/arranging articles or containers C (FIG. 2), for example, for being loaded into cartons in accordance with the disclosure. In one embodiment, the system 100 can be included in a continuous packaging machine for packaging the articles C for storage, shipping, sale, etc. For example, the packaging machine can continuously or substantially continuously feed articles C to the system 100, which conveys the articles C as described below, which can then be transferred, for example, to a carton or container to form a package.

In the illustrated embodiment, the articles C (e.g., as shown in FIGS. 1-4) can be in the form of tubs, cups, pods, etc. having tapered sides S so that the articles C are narrower at their bottoms B than at their tops T. In this regard, the tops T of the respective articles C define a first diameter that is larger than a second diameter defined by the respective bottoms B of the respective articles C.

Figure 2:
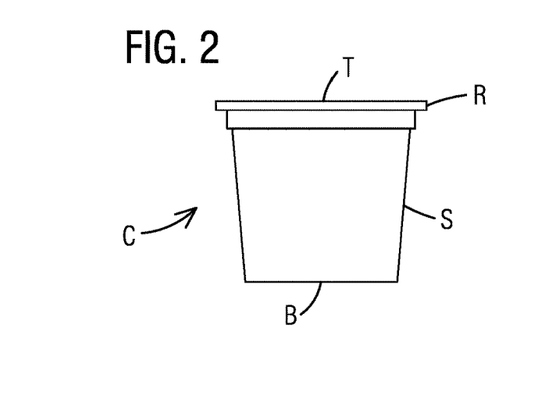
FIG. 2 is a schematic elevation view of an article for being conveyed by the system of FIG. 1 according to the first exemplary embodiment of the disclosure.

The top T of each article C can have a rim R and a lid L (e.g., a foil, film, covering, or other suitable lid) that can seal the top T at the rim R. In one exemplary embodiment, the articles C can be for containing a product for brewing a beverage (e.g., coffee, tea, cocoa, etc.) from granulized solids in a single-cup brewing system (e.g., K-Cup pods for single-cup brewing systems available from Keurig Dr. Pepper of Burlington, Mass., or other suitable containers and systems).

In the illustrated embodiment, the system 100 includes a lane combiner 101, receives the articles C from two inputs (not shown) at an upstream end 103 of the system 100, and conveys the articles C to the downstream end 105 of the system 100 in a machine direction M. In one embodiment, the articles C fed from the first input can be a first plurality of articles each designated CD and having a foil down orientation (e.g., with the lid L facing downwardly) in a first input lane 107 and the articles fed from the second input can be a second plurality of articles each designated CU and having a foil up orientation (e.g., with the lid L facing upwardly) in a second input lane 109. In one embodiment, the articles CD and the articles CU can be considered to have inverted orientations relative to one another.

The lane combiner 101 can be obtained and used to move the articles CD, CU from the respective input lanes 107, 109 into a output lane 111 so that the articles CD from the first input lane 107 alternate with the articles CU from the second input lane 109 and so that the articles CD, CU alternate between the foil down and foil up orientations in the output lane 111 in a combined plurality of articles 112. In one embodiment, a first sequential article in the output lane 111 in the machine direction M is one of an article CU of CD, and every other following article (e.g., a third sequential article, a fifth sequential article, etc.) is an article of the same configuration. In an exemplary embodiment, the articles CD, CU can move in the output lane 111 to another portion of a packaging machine to be loaded into cartons. As described herein, the input lanes 107, 109 are each in communication with and positioned upstream relative to a combination area 158 that is in communication with and positioned upstream from the output lane 111.

As shown in FIG. 1, the first input lane 107 can include a first outer lane guide 121 and a first inner lane guide 123, and the second input lane 109 can include a second outer lane guide 125 and a second inner lane guide 127. In the illustrated embodiment, the input lanes 107, 109 are initially spaced apart at the upstream end 103 of the system 100 and portions of the input lanes 107, 109 are angled toward one another upstream from the lane combiner 101 so that the outer lane guides 121, 125 are angled inwardly and such that the inner lane guides 123, 127 converge at a divider 129. In an exemplary embodiment, the divider 129 can extend from and/or be integral with one of the inner lane guides 123, 127.

In one embodiment, the articles CD, CU can move in the input lanes 107, 109 on respective input conveyors (e.g., conveyor belts or any other suitable conveyor) to the lane combiner 101. In the illustrated embodiment, as the input lanes 107, 109 converge toward the divider 129, the lane guides 121, 123 and 125, 127 can guide the respective articles CD, CU onto a main conveyor 131, which can move the articles from the respective input lanes 107, 109, through the combination area 158, and into the output lane 111. In one example, the input conveyors can be marginal portions of the main conveyer 131 or can be otherwise disposed on either side of the main conveyor 131 extending near the upstream end 103. In one embodiment, and with additional reference to FIG. 4, the main conveyor 131 can include a belt 132 or other suitable conveyor driven by a motor 133 via wheels or gears 135 and can be supported on supports 137 (e.g., the belt 132 can slide along supports 137 as it moves in the machine direction M), as shown best in FIG. 5.

Still referring to FIG. 1, the articles CD, CU are moved in the machine direction M in the respective lanes 107, 109 on the main conveyor 131 with the divider 129 extending between the lanes. Any of the input lanes 107, 109 and/or the main conveyor 131 could be omitted or could be otherwise shaped, positioned, arranged, and/or configured without departing from the disclosure.

In the illustrated embodiment, the lane combiner 101 can include a first star wheel or first combiner wheel 141 (e.g., that engages the foil down articles CD from the first input lane 107) and a second star wheel or second combiner wheel 143 (e.g., that engages the foil up articles CU from the second input lane 109) that are positioned in the combination area 158. The combiner wheels 141, 143 are positioned on opposite sides of the lane combiner 101 along a lateral axis L1 (e.g., that extends transversely across the width of the main conveyor 131, generally perpendicular to the machine direction M). Each of the combiner wheels 141, 143 has a plurality of peaks 145 and a plurality of recesses 147 interposed with the peaks 145. In one embodiment, the recesses 147 can be curved to complement the curved sides S of the articles C and the peaks 145 of each combiner wheel 141, 143 can be spaced from the respectively adjacent peaks 145 so that the recesses 147 are sized to receive and engage a respective article CD, CU (e.g., so that the recess 147 contour or otherwise extends partially around the side S of the article).

As shown in FIG. 1, the combiner wheels 141, 143 each have six peaks 145 and six recesses 147. Alternatively, the combiner wheels 141, 143 could have any suitable number of peaks 145 and recesses 147. While the combiner wheels 141, 143 are illustrated having a generally symmetrical arrangement, one or more of the combiner wheels 141, 143 could include an asymmetrical portion(s).

Figure 3:
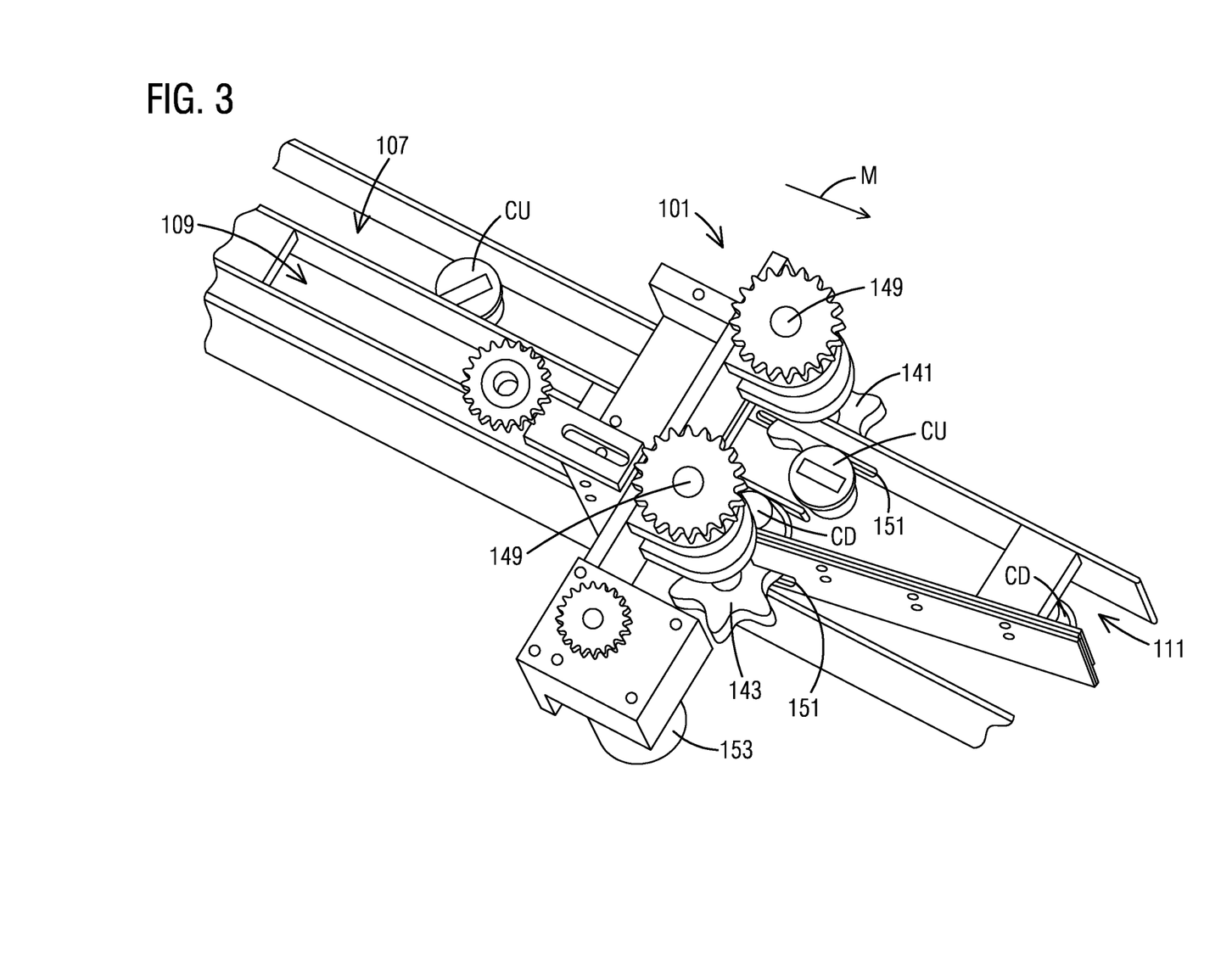
FIG. 3 is a schematic perspective view of a lane combiner apparatus of the system of FIG. 1 according to an exemplary embodiment of the disclosure.
Figure 4:
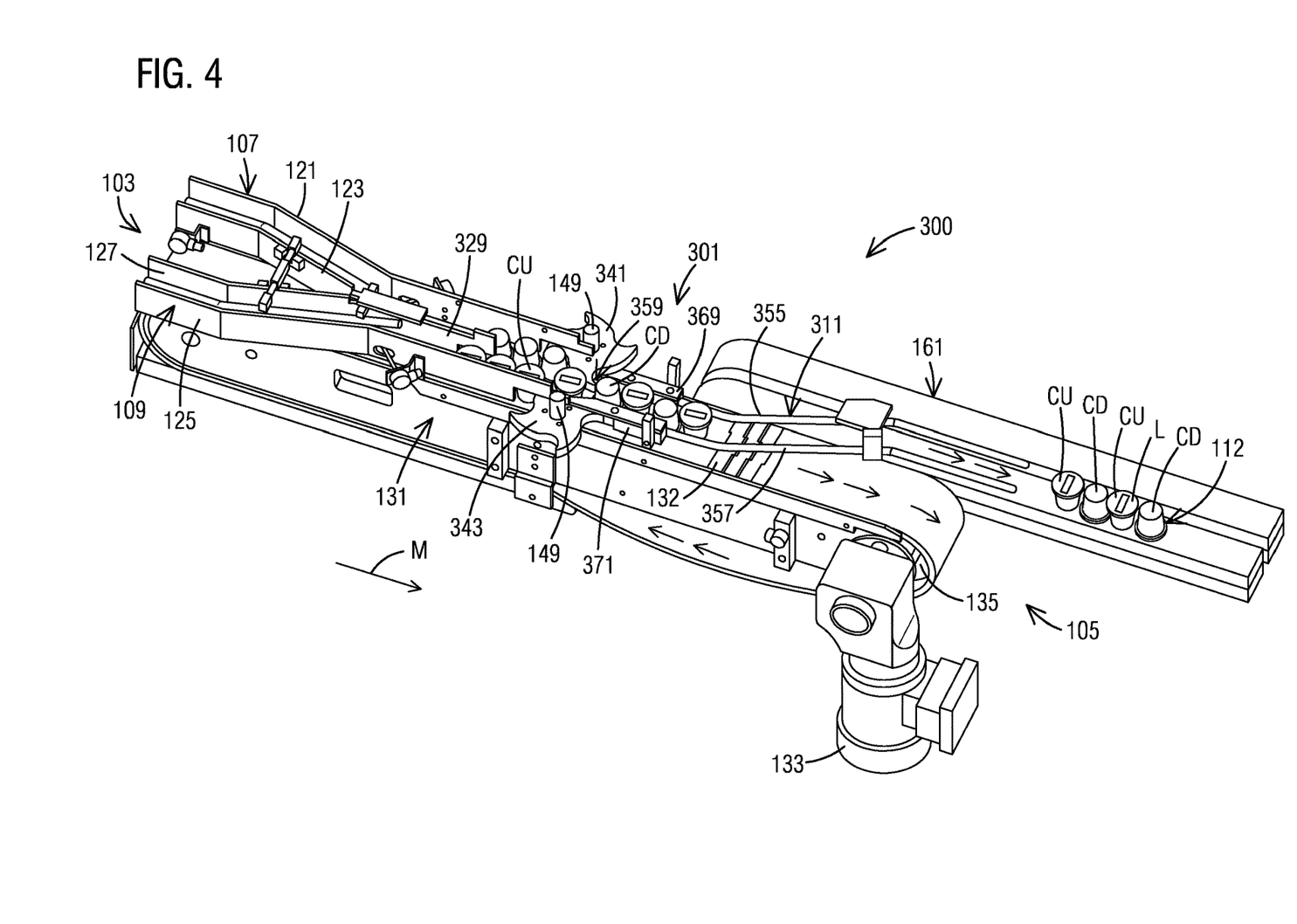
FIG. 4 is a schematic perspective view of a system conveying articles according to a second exemplary embodiment of the disclosure.

In the illustrated embodiment, the combiner wheels 141, 143 rotate on respective generally parallel axes 149 (broadly, respective "first rotational axis" and "second rotational axis") and extend into the downstream ends of the input lanes 107, 109 through the respective outer lane guides 121, 125 (e.g., through respective slots 151 in the outer lane guides 121, 125 as shown in FIG. 3). In one embodiment, the combiner wheels 141, 143 can be mounted on a respective axel or shaft that defines the respective axis 149, and are rotated by a motor 153 (FIG. 3) via gears or other actuating structure so that the first combiner wheel 141 rotates in a counterclockwise direction as viewed from above and the second combiner wheel 143 rotates in a clockwise direction as viewed from above as shown in FIG. 1. Accordingly, the peaks 145 and the recesses 147 of the combiner wheels 141, 143 each move in the machine direction M at portions thereof disposed in the respective input lanes 107, 109.

As shown in FIG. 1, the combiner wheels 141, 143 are out of phase with respect to one another. For example, one of the peaks 145 of the second combiner wheel 143 can move through the second input lane 109 at approximately the same time that the midpoint of one of the recesses 147 of the first combiner wheel 141 moves through the first input lane 107. In this regard, at a selected moment in time, the first combiner wheel 141 can be positioned at a first rotational orientation RP1 about the respective axis 149 in which a first recess 147 of the first combiner wheel 141 is positioned in the combination area 158 and is offset from a second recess 147 of the second combiner wheel 143 that is positioned in the combination area 158 when the second combiner wheel 143 is positioned at a second rotational orientation RP2 about the respective axis 149 that is different from the first rotational orientation RP1. In one embodiment, when the first recess 147 of the first combiner wheel 141 is positioned in the combination area 158, a peak 145 of the second combiner wheel 143 extends at least partially across the second input lane 109. Similarly, in one embodiment, when the first recess 147 of the second combiner wheel 143 is positioned in the combination area 158, a peak 145 of the first combiner wheel 141 extends at least partially across the first input lane 107.

Accordingly, in one embodiment, the first combiner wheel 141 is arranged for receiving a foil down article CD (broadly, "first article") from the first input lane 107 in the first recess 147 and moving the first article CD into the output lane 111, which can be sequentially followed by a foil up article CU (broadly, "second article") from the second input lane 109 that can be received and engaged by the second combiner wheel 143 and moved into the output lane 111 after the first article CD. The lane combiner 101 could be otherwise shaped, positioned, arranged, and/or configured without departing from the disclosure.

In the illustrated embodiment, the output lane 111 can include respective first and second lane guides 155, 157 that can at least partially define a combination area 158 therebetween that includes a funnel portion 159 at an upstream end of the output lane 111 that can converge in the machine direction M to accommodate the width of the articles CD, CU in the output lane 111. The funnel portion 159 includes a respective first sloped surface and a second sloped surface defined by the respective lane guides 155, 157 and that are arranged to converge toward one another. As shown in FIG. 1, the upstream ends of the lane guides 155, 157 are positioned to be proximate the downstream ends of the respective outer lane guides 121, 125 of the input lanes 107, 109. In one embodiment, the downstream ends of the outer lane guides 121, 125 can overlap the upstream ends of the lane guides 155, 157. In one embodiment, the lane guides 155, 157 can be extensions of the respective lane guides 121, 125.

As shown in FIG. 1, the articles CD, CU can move along the respective lane guides 155, 157 in the funnel portion 159 from the respective combiner wheels 141, 143 on the belt 132 of the main conveyor 131. Once the lane guides 155, 157 converge, the articles CD, CU can move along one or both of the lane guides 155, 157 as they guide the articles in the output lane 111 to an output conveyor 161 and to the downstream end 105 of the system 100. The output conveyor 161 can be a belt conveyor or any other suitable conveyor apparatus. The output lane 111 and/or the output conveyor 161 could be otherwise shaped, positioned, arranged, and/or configured without departing from the disclosure.

In operation, the foil down articles CD move in the first input lane 107 from the upstream end 103 of the system 100 along one or both of the lane guides 121, 123 onto the main conveyor 131. Similarly, the foil up articles CU move in the second input lane 109 from the upstream end 103 along one or both of the lane guides 125, 127 onto the main conveyor 131. In the illustrated embodiment, as the articles CD, CU move on the main conveyor 131 in the machine direction M, the articles move past the downstream end of the inner lane guides 123, 127 (e.g., where the inner lane guides 123, 127 converge at the divider 129) and then the foil down articles CD move between the outer lane guide 123 and the divider 129 and the foil up articles CU move between the outer lane guide 125 and the divider 129. The articles CD, CU continue to move on the main conveyor 131 through the lane combiner 101 where the foil down articles CD in the first input lane 107 sequentially engage the first combiner wheel 141 and the foil up articles CU in the second input lane 109 sequentially engage the second combiner wheel 143.

In one embodiment, one of the foil down articles CD can engage a peak 145 of the first combiner wheel 141 as that peak 145 moves into the first input lane 107 (e.g., see the article CD in position P1 in FIG. 1). As that peak 145 moves through the first input lane 107, the main conveyor 131 urges the foil down article CD in the machine direction M so that the article CD engages, e.g., is at least partially received by, a recess 147 adjacent the peak 145 that is moving through the first input lane 107 (e.g., see the article CD in position P2 in FIG. 1). The foil down article CD in the position P2 is now received in the recess 147 between two peaks 145 and is moved in the first input lane 107 by the first combiner wheel 141 as the recess 147 moves through the first input lane 107.

In one embodiment, the combiner wheels 141, 143 can rotate at a rate so that the articles CD, CU are moved by the respective combiner wheels 141, 143 at a different speed than the belt 132, (e.g., the combiner wheels 141, 143 can move the articles slower or faster than the belt 132). In this regard, the main conveyor 131 can move faster than the combiner wheels 141, 143 so that the articles CD, CU move faster in the funnel portion 159 of the output lane 111 than the articles CD, CU in the lane combiner 101, e.g., because the rotational engagement of the combiner wheels 141, 143 with the respective articles CD, CU regulates the linear speed of the articles CD, CU, which can cause the articles CD, CU to slide along the belt 132 when engaged with the respective combiner wheels 141, 143. Such a configuration can be provided, for example, to provide clearance between one or more articles to facilitate positioning of articles on the system 100, to form product groupings of preselected number/size, to accommodate disparate timing of components of the system 100, to provide opportunities for visual inspection or manual adjustment, etc. Alternatively, the combiner wheels 141, 143 can move the articles at a similar or same rate as the belt 132.

In one embodiment, the main conveyor 131 can move faster than the combiner wheels 141, 143 so that the articles CD, CU move faster in the funnel portion 159 of the output lane 111 than the articles CD, CU in the lane combiner 101 (e.g., because the rotational engagement of the combiner wheels 141, 143 with the respective articles CD, CU regulates the linear speed of the articles CD, CU). This faster movement of the articles CD, CU in the output lane 111 can help provide clearance between the articles in the output lane 111 and the subsequent article released by the combiner wheels 141, 143.

Once the leading peak 145 of the recess 147 that is engaging the article CD rotates out of the first input lane 107, the article CD can move out of the recess 147 and into the funnel portion 159 of the output lane 111 on the main conveyor 131 (e.g., see the article CD in the position P3 in FIG. 1). In the illustrated embodiment, while the first combiner wheel 141 is moving a particular foil down article CD in the first input lane 107 (e.g., the article CD in position P2 in FIG. 1), the second combiner wheel 143 receives in a respective recess 147 a particular foil up article CU that is slightly upstream with respect to that foil down article CD (e.g., the article CU in position P4 is slightly upstream from the article CD in position P2 in FIG. 1). As the article CD is moved into the output lane 111 (e.g., the article CD in position P3 in FIG. 1), the second combiner wheel 143 is moving the foil up article CU (e.g., in position P5 in FIG. 1) in the second input lane 109 into position to be moved into the output lane 111 subsequent to the article CD in position P3.

In this regard, with respect to the foil up article CU in position P5, the peak 145 of the second combiner wheel 143 that is retaining that article in the recess 147 is moving through the slot 151 in the outer lane guide 125 as shown in FIG. 1 so that the main conveyor 131 can move the article CU in position P5 out of the recess 147 and into the output lane 111 subsequent to the article CD in position P3 that was previously moved into the output lane 111.

In the illustrated embodiment, the aforementioned out of phase rotation of the combiner wheels 141, 143 combines and moves the articles CD, CU into the output lane 111 from the first input lane 107 and then from the second input lane 109 so that the articles CD, CU alternate in sequence in the output lane 111 between foil down articles CD from the first input lane 107 and foil up articles CU from the second input lane 109 to form the combined plurality of articles 112. The main conveyor 131 can move the combined plurality of articles 112 into the output lane 111, which can then move the alternating articles CD, CU in the downstream direction to the output conveyor 161 to the downstream end 105 of the system 100. Subsequently, the articles can be further processed (e.g., wrapped, loaded into cartons, etc.).

It will be understood that the above-described operation of the lane combiner 101 that moves a first article CD from the first input lane 107 into the output lane 111 sequentially followed by a second article CU from the second input lane 109 can be repeated any desired number of times, e.g., such that a third article CD from the first input lane 107 is engaged by the first combiner wheel 141 and moved into the output lane 111 sequentially behind the second article CU and such that a fourth article CU from the second input lane 107 is engaged by the second combiner wheel 143 and moved into the output lane 111 sequentially behind the third article CD, etc.

The articles CD, CU could be otherwise combined into a single lane without departing from the disclosure. For example, the foil up articles CU could be moved in the first input lane 107 and the foil down articles CD could be moved in the second input lane 109 (e.g., as shown in FIG. 3). In another example, the lane combiner 101 could be configured to move more than one article at a time from each input lane 107, 109 (e.g., so that orientation of the articles in the output lane 111 alternates at every two or more articles).

Figure 5:
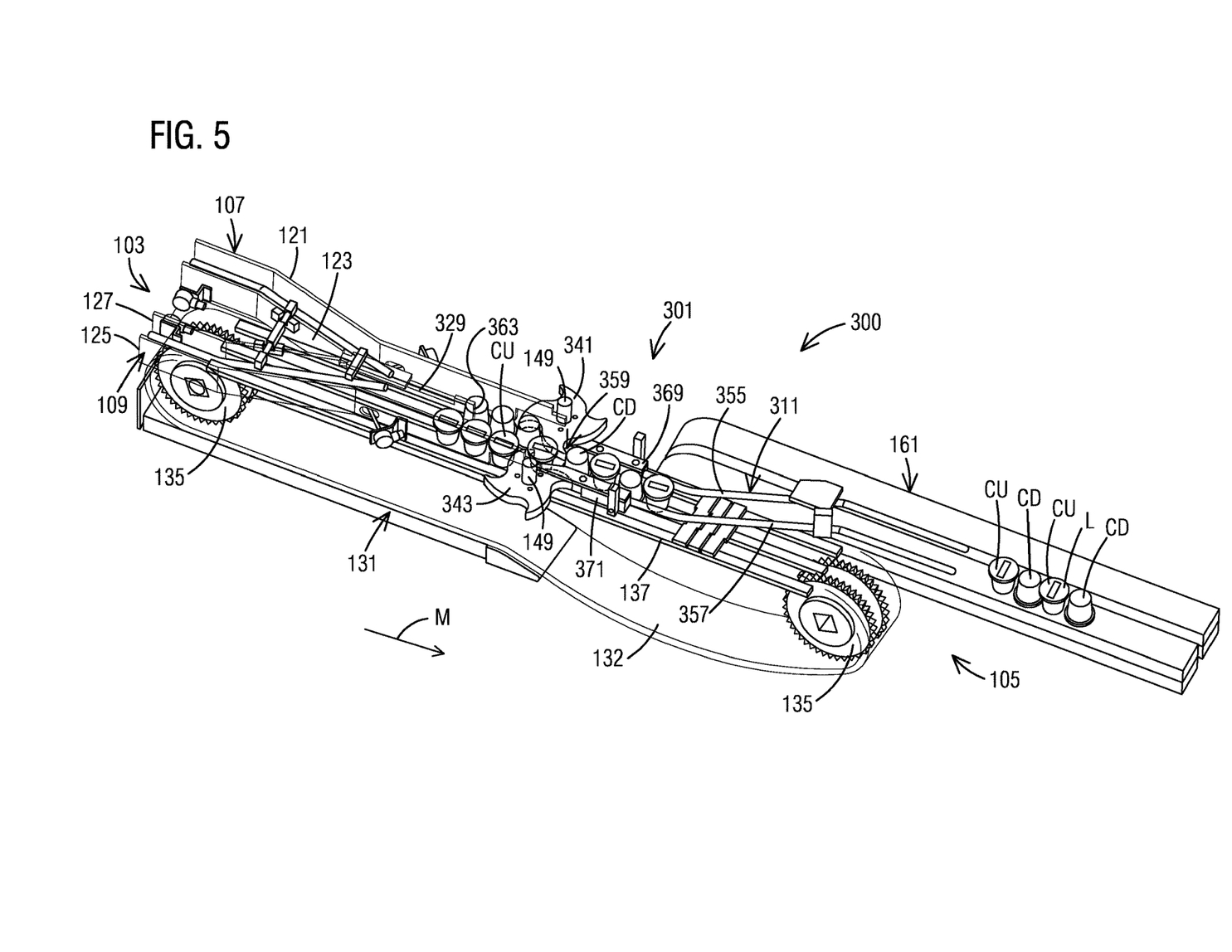
FIG. 5 is another schematic perspective view of the system of FIG. 4, with portions thereof shown in phantom lines.

FIG. 5 is an isometric view of a conveyor portion of a system and method 300 for conveying/arranging articles or containers C for being loaded into cartons (not shown) according to a second exemplary embodiment of the disclosure. The second exemplary embodiment can include one or more features that are substantially the same or substantially similar to those described above with regard to the first exemplary embodiment, and like or similar features are designated with like or similar reference numbers.

Figure 6:
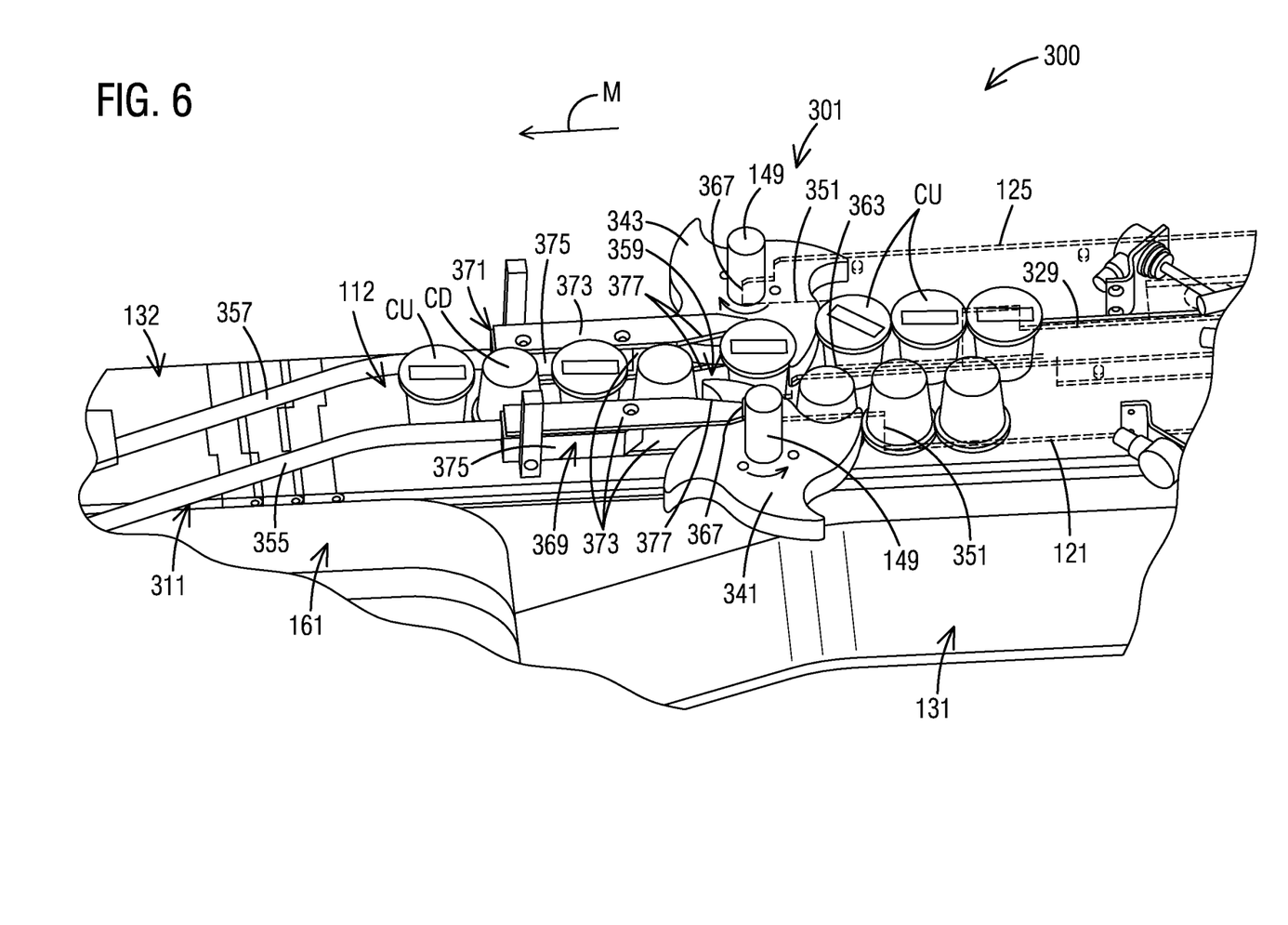
FIG. 6 is a schematic perspective view of a lane combiner of the system of FIG. 4.
Figure 7:
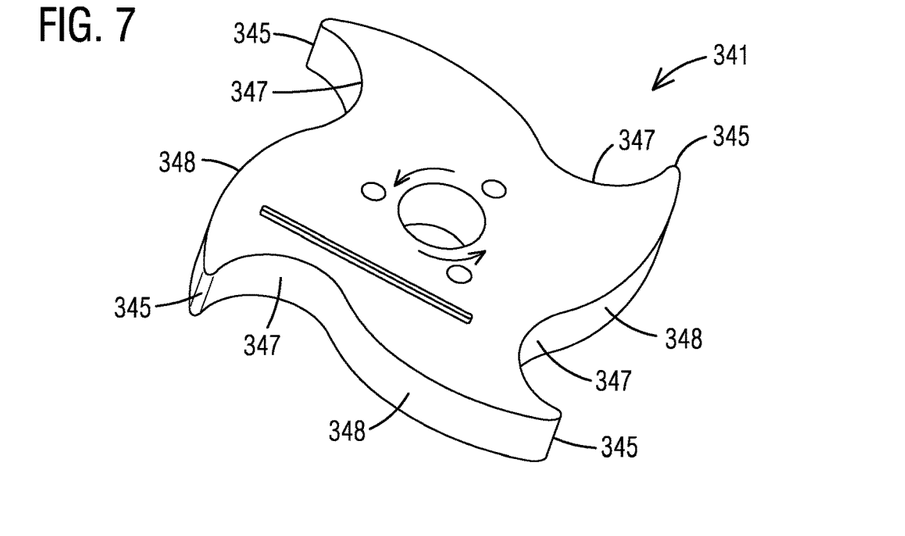
FIG. 7 is a schematic perspective view of a combiner wheel of the system of FIG. 4.
Figure 8:
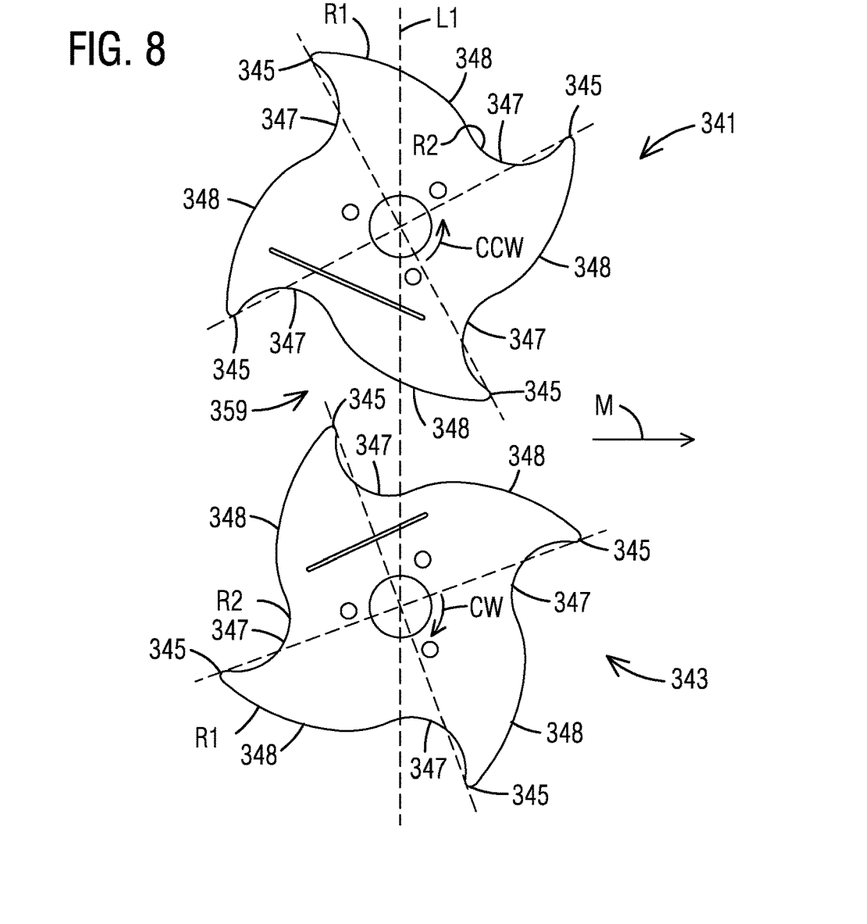
FIG. 8 is a schematic plan view of the combiner wheels of the system of FIG. 4.

As shown in FIGS. 5 and 6, the system 300 has a lane combiner 301 with respective first and second combiner wheels 341, 343 that can have a different configuration than the combiner wheels 141, 143 of the first exemplary embodiment. In addition, the combiner wheels 341, 343 are positioned closer together in a combination area 359 of the lane combiner 301. It will be understood the combiner wheels 341, 343 can have a different configuration and/or positioning without departing from the disclosure.

As described herein, the input lanes 107, 109 are each in communication with and positioned upstream relative to a combination area 359 that is in communication with and positioned upstream from an output lane 311. In this regard, the first plurality of articles CD and the second plurality of articles CU can be moved in a downstream direction to the lane combiner 301 in a manner similar to that described above with regard to the system 100.

The output lane 311 of the system 300 can include respective first and second lane guides 355, 357 that at least partially define the combination area 359 therebetween and do not include the funnel portion of the first exemplary embodiment. Rather, the arrangement of the combiner wheels 341, 343 in the combination area 359 can obviate any additional need for a funnel portion, as described further below.

As shown in FIGS. 5 and 6, the combination area 359 of the lane combiner 301 is defined at a downstream end 363 of the divider 329 and between the outer lane guides 121, 125. In one embodiment, the outer lane guides 121, 125 can include cutouts 351 extending to their respective downstream ends 367, and the cutouts 351 can be configured such that at least a portion of the respective the combiner wheels 341, 343 extend therethrough.

Two guide brackets 369, 371 can extend along the combination area 359 from the upstream ends of the lane guides 355, 357 of the output lane 311 to the downstream ends 367 of the outer lane guides 121, 125 and can overlap with portions of the outer lane guides 121, 125. Each of the guide brackets 369, 371 can include two plates 373 connected by a spacer element 375. In one embodiment, the spacer element 375 can be connected to the upstream end of the respective lane guide 355, 357. The spacer element 375 can form a gap between the plates 373 to provide clearance for the respective combiner wheels 341, 343. Each of the plates 373 can include/define a respective sloped edge 377 (broadly, respective "first sloped surface" and "second sloped surface") that are arranged to converge toward one another and that can guide the articles CD, CU from the combination area 359 to the output lane 311 as the combiner wheels 341, 343 move the articles CD, CU through the combination area 359.

Figure 9:
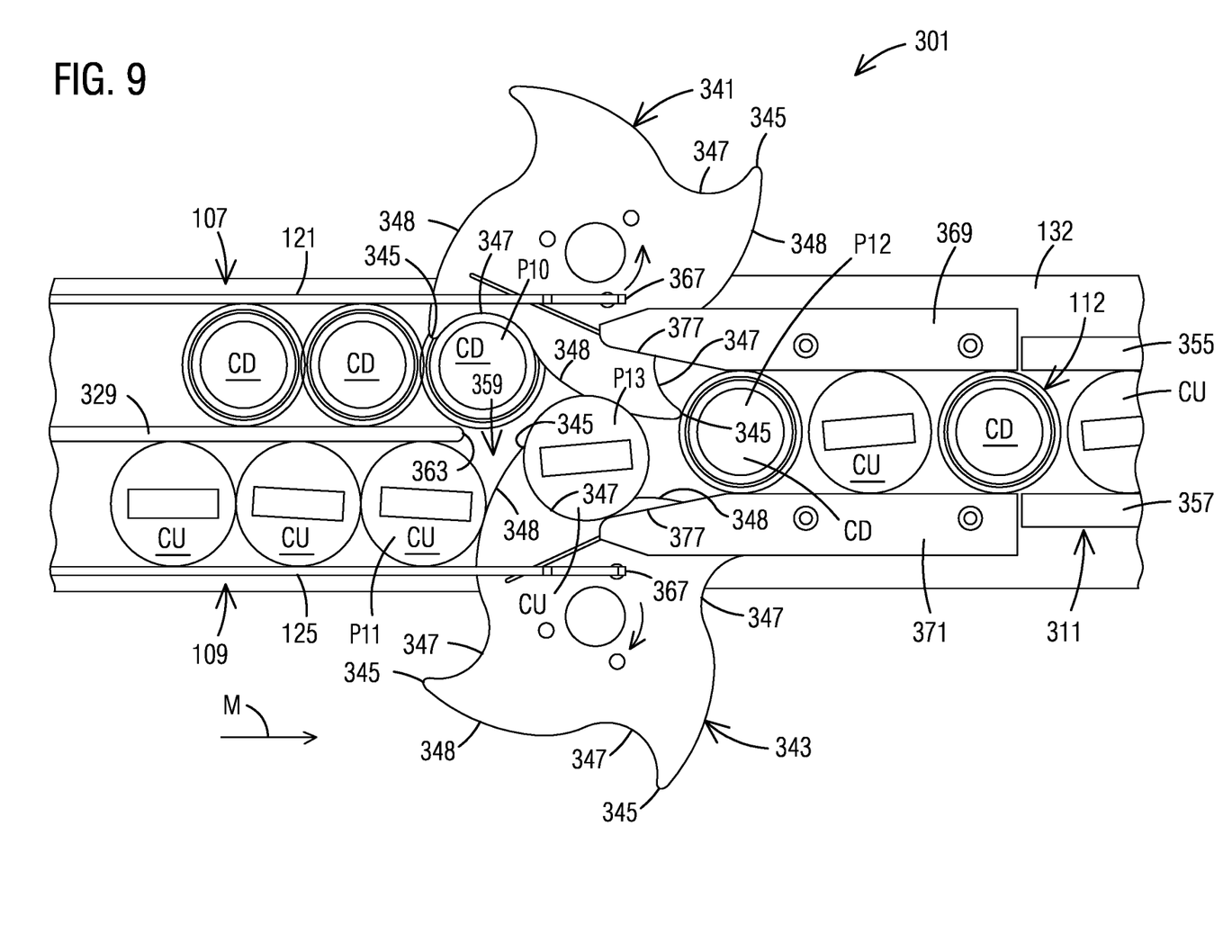
FIG. 9 is a schematic plan view of the combiner wheels of FIG. 8 engaging articles in the lane combiner of FIG. 6.

The first combiner wheel 341 is shown in FIG. 9 and includes a plurality of peaks 345 with a plurality of recesses 347 and a plurality convex surfaces 348 interposed with the peaks 345. In one embodiment, the recesses 347 can be curved (e.g., can have a concave curved surface) to complement the curved sides S of the articles C and each recess 347 can extend from the adjacent convex surface 348 to the adjacent peak 345 and can be sized to receive and engage a respective article C (e.g., so that the concave surface of the recess 347 extends partially around the side S of the article).

In the illustrated embodiment, each of the convex surfaces 348 extends from one of the peaks 345 to the adjacent recess 347 and defines an elongate (e.g., relative to the recesses 347), convex curve. In one embodiment, each convex surface 348 can define a radius of curvature R1 that is larger than a radius of curvature R2 defined by the respective recesses 347.

Figure 10:
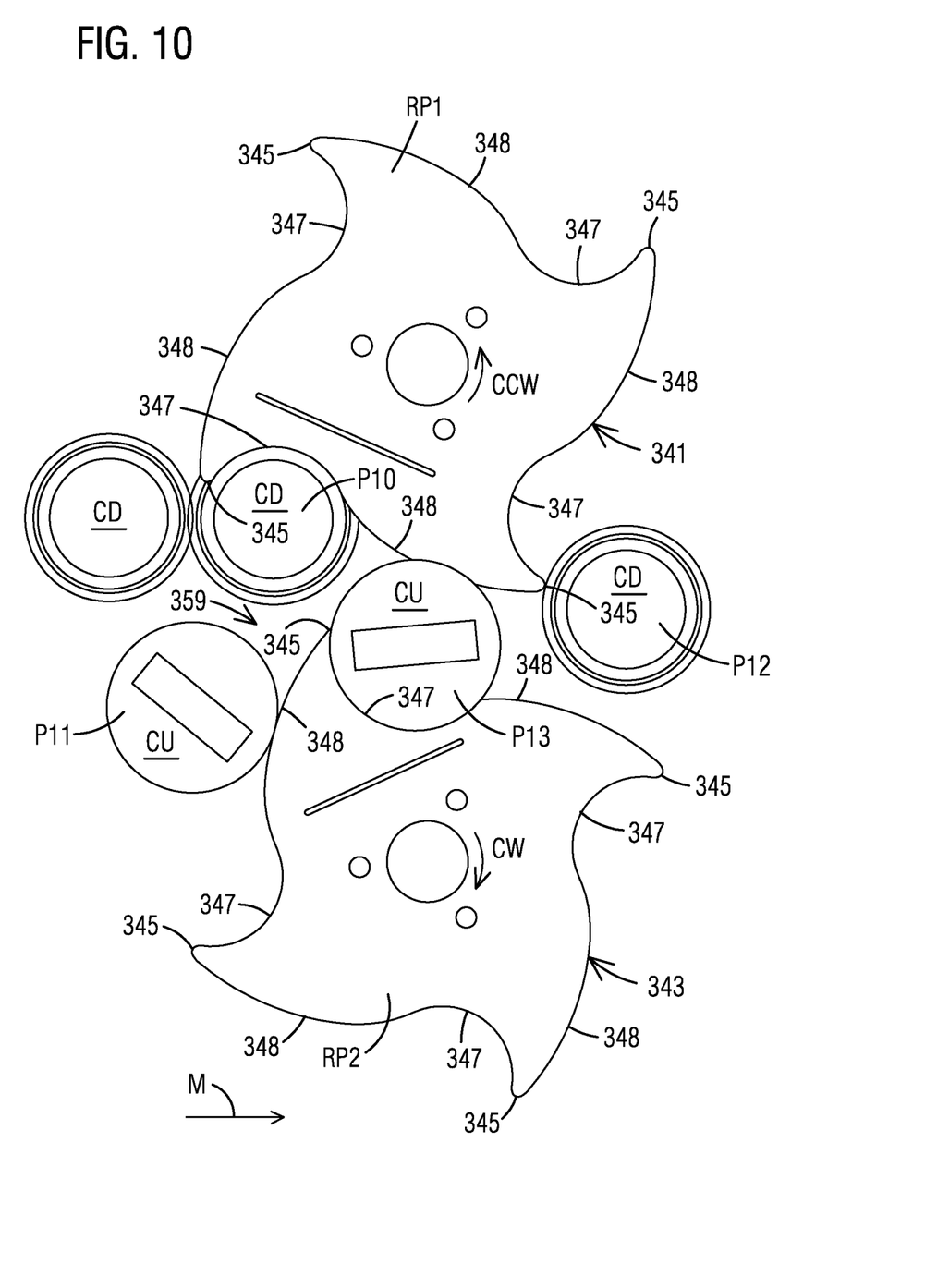
FIG. 10 is another schematic plan view of the combiner wheels of FIG. 8 engaging articles in the lane combiner of FIG. 6.

As shown in FIG. 9, the combiner wheel 341 has four peaks 345, four recesses 347, and four convex surfaces 248. Alternatively, the combiner wheel 341 could have any suitable number of peaks 345, recesses 347, and convex surfaces 348. As shown in FIG. 10, the second combiner wheel 343 is similar to the first combiner wheel 341 except that the first combiner wheel 341 is configured for rotating in a counterclockwise direction CCW and the second combiner wheel 343 is configured for rotating in a clockwise direction CW. Alternatively, one of the combiner wheels 341, 343 could be considered to be upside-down with respect to the other.

As shown in FIGS. 9 and 10, the combiner wheels 341, 343 rotate on respective axes 149 and extend into the combination area 359 (e.g., through slots 351 in the outer lane guides 121 and the gaps formed between the plates 373 of the guide brackets 369, 371). In one embodiment, the combiner wheels 341, 343 are rotated by a motor (not shown) via gears so that the first combiner wheel 341 rotates in the counterclockwise direction CCW as viewed from above and the second combiner wheel 343 rotates in the clockwise direction CW as viewed from above as shown in FIGS. 5-12. Accordingly, the peaks 345, the recesses 347, and the convex surfaces 348 of the combiner wheels 341, 343 move in the machine direction M through the combination area 359.

As shown in FIG. 10, the centers of the combiner wheels 341, 343 are aligned on the lateral axis L1 that extends transversely across the width of the main conveyor 131, generally perpendicular to the machine direction M). In the illustrated embodiment, the combiner wheels 341, 343 are out of phase with respect to one another, wherein the peak 345 of one of the combiner wheels 341, 343 moves through the combination area 359 followed by, e.g., at a different point in time than, the peak 345 of the opposing combiner wheel 343, 341.

As shown, each of the recesses 347 is opposed by a convex curve 348 of the opposing combiner wheel as the recess 347 and the convex curve 348 move through the combination area 359, as the convex curve 348 moves through the combination area 359 ahead of the respective recess 347 to facilitate the retention of a respective article CD, CU in the respective recess 347 through the combination area 359. Accordingly, in one embodiment, the first combiner wheel 341 is arranged for engaging and receiving a move a foil down article CD (broadly, "first article") from the first input lane 107 in the first recess 347 and moving the first article CD into the output lane 311, which can be sequentially followed by a foil up article CU (broadly, "second article") from the second input lane 109 that can be engaged and received by the second combiner wheel 343 and moved into the output lane 311 after the first article CD. The lane combiner 301 could be otherwise shaped, positioned, arranged, and/or configured without departing from the disclosure.

In this regard, at a selected moment in time, the first combiner wheel 341 can be positioned at a first rotational orientation RP1 about the respective axis 149 in which a first recess 347 of the first combiner wheel 341 is positioned in the combination area 359 and is offset from a second recess 347 of the second combiner wheel 343 that is positioned in the combination area 359 when the second combiner wheel 343 is positioned at a second rotational orientation RP2 about the respective axis 149 that is different from the first rotational orientation RP1. In one embodiment, when the first recess 347 of the first combiner wheel 341 is positioned in the combination area 359, a peak 345 of the second combiner wheel 343 extends at least partially across the second input lane 109. Similarly, in one embodiment, when the first recess 347 of the second combiner wheel 343 is positioned in the combination area 359, a peak 345 of the first combiner wheel 341 extends at least partially across the first input lane 107.

In operation, the foil down articles CD move in the first input lane 107 from the upstream end 103 of the system 100 along one or both of the lane guides 121, 123 onto the main conveyor 131. Similarly, the foil up articles CU move in the second input lane 109 from the upstream end 103 along one or both of the lane guides 125, 127 onto the main conveyor 131. In the illustrated embodiment, as the articles CD, CU move on the main conveyor 131 in the machine direction M, the articles move past the downstream end of the inner lane guides 123, 127 (e.g., where the inner lane guides 123, 127 converge) and then the foil down articles CD move between the outer lane guide 123 and the divider 329 and the foil up articles CU move between the outer lane guide 125 and the divider 329.

The articles CD, CU continue to move on the main conveyor 131 through the lane combiner 301 where the articles CD, CU sequentially and alternatingly engage the combiner wheels 341, 343. In one embodiment, the combination area 359 can be devoid of the divider 329, e.g., a downstream end 363 of the divider 329 can abut or be spaced upstream from the combination area 359.

In one embodiment, one of the foil down articles CD that is adjacent the downstream end 363 of the divider 329 can engage a recess 347 of the first combiner wheel 341 (e.g., see the article CD in position P10 in FIG. 9) while the foil up article CU adjacent the downstream end 363 of the divider 329 can engage a convex surface 348 of the second combiner wheel 343 (e.g., see the article CD in position P11 in FIGS. 11 and 12).

As the combiner wheels 341, 343 rotate, the convex surface 348 of the second combiner wheel 343 slides against the article CU in the P11 position, preventing the articles CU in the second input lane 109 from advancing (e.g., due to the motion of the belt 132) into the combination area 359 while the article CD in the P10 position is captured by the recess 347 of the first combiner wheel 341, which can move the article CD into the output lane 311 (e.g., see the article CD in position P12 in FIGS. 11 and 12). As the foil down article CD is moved through the combination area 359, the subsequent article CD in the input lane 107 can engage the convex surface 348 subsequent to the recess 347 that engaged the article CD in the P10 position. As shown in FIGS. 11 and 12, an article CU in a position P13 is engaged between a recess 347 of the second combiner wheel 343 and a convex surface 348 of the combiner wheel 341 as the combiner wheels rotate and move the article CU in position P13 through the combination area 359.

As the combiner wheels 341, 343 rotate to move the articles CD, CU to the downstream end of the combination area 359, the articles engage the sloped edges 377 of the guide brackets 369, 371, which guide the articles CD, CU into the output lane 311 as the articles move on the belt 132 out of the recesses 347 of the combiner wheels 341, 343.

In this regard, the combiner wheels 341, 343 rotate to combine and move the articles CD, CU into the output lane 311 so to form the combined plurality of articles 112 in which the articles alternate between the foil up articles CU and the foil down articles CD in sequence. The articles move on the belt in the output lane 311 in the downstream direction from the lane combiner 301 to the output conveyor 161. In this regard, the system 300 can be included in a continuous packaging machine for packaging the articles C for storage, shipping, sale, etc. For example, the packaging machine can continuously or substantially continuously feed articles C to the system 300, which conveys the articles C as described below, which can then be transferred, for example, to a carton or container to form a package.

It will be understood that the above-described operation of the lane combiner 301 that moves a first article CD from the first input lane 107 into the output lane 311 sequentially followed by a second article CU from the second input lane 109 can be repeated any desired number of times, e.g., such that a third article CD from the first input lane 107 is engaged by the first combiner wheel 341 and moved into the output lane 311 sequentially behind the second article CU and such that a fourth article CU from the second input lane 107 is engaged by the second combiner wheel 343 and moved into the output lane 311 sequentially behind the third article CD, etc.

The above-described systems 100, 300 for receiving the articles C from two inputs with opposing orientations and then combining the inputs into a single lane so that the articles alternate between the two orientations can be more reliable and faster than, for example, a system that receives the articles in a single input all having the same orientation and that reorients every other article to achieve an output with articles in alternating orientations. For example, such a system that is devoid of the lane combiner 101, 301 of the respective systems 100, 300 can have problems with reorienting the articles, which can slow the process and/or result in output that is not consistent in the alternating orientation of the articles, resulting in efficiency losses. In contrast, the systems 100, 300 obviate any need to reorient articles therealong. Rather, the articles can be input into the second input lanes 107, 109 and 307, 309 of the respective systems 100 in respective desired orientations.

It will be understood that the configuration and arrangement of the components of the systems 100, 300 can be altered without departing from the disclosure. In one embodiment, one or more systems 100, 300 can be provided and run in parallel, for example, to increase output. In one embodiment, one or both of the systems 100, 300 can be provided with a lane combiner that is configured to combine multiple pairs of input lanes into respective single output lanes in accordance with the discussion above, and/or can be configured to combine more than two input lanes into a single output lane.

Any of the features of the various embodiments of the disclosure can be combined with, replaced by, or otherwise configured with other features of other embodiments of the disclosure without departing from the scope of this disclosure.

The foregoing description of the disclosure illustrates and describes various embodiments. As various changes could be made in the above construction without departing from the scope of the disclosure, it is intended that all matter contained in the above description or shown in the accompanying drawings shall be interpreted as illustrative and not in a limiting sense. Furthermore, the scope of the present disclosure covers various modifications, combinations, alterations, etc., of the above-described embodiments. Additionally, the disclosure shows and describes only selected embodiments, but various other combinations, modifications, and environments are within the scope of the disclosure as expressed herein, commensurate with the above teachings, and/or within the skill or knowledge of the relevant art. Furthermore, certain features and characteristics of each embodiment may be selectively interchanged and applied to other illustrated and non-illustrated embodiments of the disclosure.

What is claimed is:

1. A system for conveying articles, comprising:
a first plurality of articles comprising a first article;
a second plurality of articles comprising a second article, each article of the first plurality of articles in an inverted orientation relative to a respective article of the second plurality of articles;
a first input lane;
a second input lane, the second article received in the second input lane at an upstream end of the system, the first article is received in the first input lane at an upstream end of the system in an inverted orientation relative to the second article; and
a lane combiner positioned downstream from the first input lane and the second input lane and comprising a first combiner wheel that is out of phase with a second combiner wheel,
the first combiner wheel is positioned to engage the first article from the first plurality of articles in the first input lane and the second combiner wheel is positioned to engage the second article from the second plurality of articles in the second input lane,
upon out of phase rotation of the first combiner wheel and the second combiner wheel, the first article is moved into the output lane and the second article is moved into the output lane after the first article to form a combined plurality of articles that comprises the first article and second article in sequence.

2. The system of claim 1, wherein the first combiner wheel comprises a plurality of recesses each configured to receive a respective article of the first plurality of articles, and the second combiner wheel comprises a plurality of recesses each configured to receive a respective article of the second plurality of articles.

3. The system of claim 2, wherein the plurality of recesses of the first combiner wheel are interposed with a plurality of peaks of the first combiner wheel, and the plurality of recesses of the second combiner wheel are interposed with a plurality of peaks of the second combiner wheel.

4. The system of claim 3, wherein the plurality of peaks of at least one of the first combiner wheel and the second combiner wheel define a respective convex surface with a first radius of curvature that is greater than a second radius of curvature of a respective concave surface defined by the plurality of recesses of the at least one of the first combiner wheel and the second combiner wheel.

5. The system of claim 2, wherein when a recess of the first combiner wheel is positioned in a combination area of the lane combiner, a peak of the second combiner wheel at least partially extends across the second input lane.

6. The system of claim 1, wherein the first input lane comprises a first outer lane guide and the second input lane comprises a second outer lane guide, and a combination area is at least partially defined between the first outer lane guide and the second outer lane guide, the combination area is in communication with each of the first input lane, the second input lane, and the output lane.

7. The system of claim 6, wherein the first input lane and the second input lane are separated by a divider, the combination area is devoid of the divider.

8. The system of claim 6, wherein at least a portion of the first combiner wheel extends through a slot in the first outer lane guide, and at least a portion of the second combiner wheel extends through a slot in the second outer lane guide.

9. The system of claim 8, wherein the first outer lane guide and the second outer lane guide overlap a respective first sloped surface and second sloped surface, the first sloped surface and the second sloped surface are arranged to converge toward one another.

10. The system of claim 9, wherein the first sloped surface and the second sloped surface are defined by a respective first lane guide of the output lane and a second lane guide of the output lane.

11. The system of claim 9, wherein the first sloped surface and the second sloped surface are defined by a respective first guide bracket and a second guide bracket.

12. The system of claim 6, wherein the combination area is positioned upstream relative to the output lane.

13. The system of claim 1, wherein the first combiner wheel rotates about a first rotational axis and the second combiner wheel rotates about a second rotational axis, the first rotational axis is parallel to the second rotational axis.

14. The system of claim 1, wherein the lane combiner is positioned above a conveyor configured to move each of the first article and the second article from the respective first input lane and the second input lane, through a combination area, and into the output lane.

15. A lane combiner, comprising:
a first plurality of articles comprising a first article;
a second plurality of articles comprising a second article;
a first combiner wheel; and
a second combiner wheel that is out of phase with the first combiner wheel;
the lane combiner is positioned downstream from a first input lane and a second input lane such that the first combiner wheel is positioned to engage a first article from the first plurality of articles in the first input lane and the second combiner wheel is positioned to engage a second article from the second plurality of articles in the second input lane, the first article for being received in the first input lane at an upstream end of a system for conveying articles in an inverted orientation relative to the second article, the second article for being received in the second input lane at the upstream end of the system for conveying articles,
upon out of phase rotation of the first combiner wheel and the second combiner wheel, the first article is moved into the output lane and the second article is moved into the output lane after the first article to form a combined plurality of articles that comprises the first article and second article in sequence.

16. The lane combiner of claim 15, wherein the first combiner wheel comprises a plurality of recesses each configured to receive a respective article of the first plurality of articles, and the second combiner wheel comprises a plurality of recesses each configured to receive a respective article of the second plurality of articles.

17. The lane combiner of claim 16, wherein the plurality of recesses of the first combiner wheel are interposed with a plurality of peaks of the first combiner wheel, and the plurality of recesses of the second combiner wheel are interposed with a plurality of peaks of the second combiner wheel.

18. The lane combiner of claim 17, wherein the plurality of peaks of at least one of the first combiner wheel and the second combiner wheel define a respective convex surface with a first radius of curvature that is greater than a second radius of curvature of a respective concave surface defined by the plurality of recesses of the at least one of the first combiner wheel and the second combiner wheel.

19. The lane combiner of claim 16, wherein when a recess of the first combiner wheel is positioned in a combination area of the lane combiner, a peak of the second combiner wheel at least partially extends across the second input lane.

20. The lane combiner of claim 16, wherein at least a portion of the first combiner wheel extends through a slot in a first outer lane guide extending along the lane combiner, and at least a portion of the second combiner wheel extends through a slot in a second outer lane guide extending along the lane combiner.

21. The lane combiner of claim 15, wherein the first combiner wheel rotates about a first rotational axis and the second combiner wheel rotates about a second rotational axis, the first rotational axis is parallel to the second rotational axis.

* * * * *